US005266144A

United States Patent [19]

[11] Patent Number: 5,266,144

[45] Date of Patent: Nov. 30, 1993

Gaeto, Jr.

[54] INTERCHANGEABLE DISPLAY SYSTEM FOR INDICIA SUCH AS BUMPER STICKERS AND THE LIKE

[76] Inventor: Paul A. Gaeto, Jr., 1033 Alta St., Metairie, La. 70001

[21] Appl. No.: 982,618

[22] Filed: Nov. 27, 1992

Related U.S. Application Data

[62] Division of Ser. No. 719,257, Jun. 21, 1991.

[51] Int. Cl.[5] .......... C09J 5/10; G09F 21/04

[52] U.S. Cl. .......... 156/306.6; 40/591; 156/344

[58] Field of Search .......... 156/306.6, 344, 313, 156/289, 247; 40/643, 644, 661, 649, 591, 593, 594, 630, 588, 589, 590; 248/548, 909; 283/81

[56] References Cited

U.S. PATENT DOCUMENTS

| | | | |
|---|---|---|---|
| 1,836,154 | 12/1931 | Cobbs | 40/644 |
| 1,842,744 | 1/1932 | Bronner | 40/644 |
| 2,030,135 | 2/1936 | Carpenter | 156/344 |
| 2,110,768 | 3/1938 | Kellogg | 40/643 |
| 2,925,675 | 2/1960 | Lumpkin | 40/643 |
| 3,254,435 | 6/1966 | Rix | 40/593 |
| 3,481,059 | 12/1969 | Lowmaster | 40/643 |
| 3,553,865 | 1/1971 | Jones | 40/643 |
| 3,826,026 | 7/1974 | Bevan | 40/644 |
| 4,246,709 | 1/1981 | Selleslags . | |
| 4,305,216 | 12/1981 | Skelton | 40/644 |
| 4,453,328 | 6/1984 | Connolly | 40/591 |
| 4,726,972 | 2/1988 | Instance | 428/40 |
| 4,736,539 | 4/1988 | Dickinson | 40/591 |
| 4,756,106 | 7/1988 | Foster | 40/591 |
| 4,955,153 | 9/1990 | Albrecht et al. | 40/661 |
| 4,964,513 | 10/1990 | Ingram et al. | 283/81 |
| 5,077,925 | 1/1992 | Herrera et al. | 40/642 |
| 5,096,226 | 3/1992 | Steffen | 281/5 |

*Primary Examiner*—Michael W. Ball
*Assistant Examiner*—Daniel J. Stemmer
*Attorney, Agent, or Firm*—C. Emmett Pugh

[57] ABSTRACT

A display device system preferably made of flexible material for the removable, changeable displaying of bumper stickers and related indicia on vehicles and the like. The improved system includes a rectangular display sleeve having a transparent outer wall with a like configured, rectangular base member joined to the sleeve member by a heat seal at their side edges. The base member on its rear face includes an adhesive surface for adhering the display device to the vehicle. The sleeve member utilizes a flexible, zippered sleeve or envelope with a transparent front, with the display indicia item being inserted into the sleeve through the zippered edge, which is thereafter zippered closed. The base and sleeve members form an accordion-type fold, in which the fold faces are adhered together during use using an adhesive with lesser holding strength than that used to adhere the base member to the vehicle. To remove the display device from the vehicle, the forward fold member carrying the sleeve structure is initially pulled away from the rear fold in a first direction toward the joined edge of the fold, overcoming the lesser strength adhesive, with the then pulled-away, forward fold being effectively used as a gripping handle and pulled back in the opposite direction to reliably remove the base member from the vehicle surface. In an alternative embodiment (FIG. 4) suction cups on tabs are provided to affix the display device to, for example, the rear window of the vehicle using the suction cups.

6 Claims, 3 Drawing Sheets

INTERCHANGEABLE DISPLAY SYSTEM FOR INDICIA SUCH AS BUMPER STICKERS AND THE LIKE

This application is a continuation, of application Ser. No. 07/719,257, filed Jun. 21, 1991.

BACKGROUND OF INVENTION

1. Field of Invention

The present invention relates to display devices and more particularly to a sleeve for the removable, temporary displaying of bumper stickers and related indicia on vehicles and the like.

The present invention provides an improved method and apparatus for the displaying of bumper stickers and like items, the improvement including a system for adhering the display to the vehicle in a manner which is easily and reliably removed without leaving any residual adhesive, plastic or paper on the vehicle, and without damaging the paint of the vehicle.

Further, the present invention provides, an improved system for the displaying of a variety of different bumper stickers or the like, allowing the easy removal and changing of the display without the need for utilizing the adhesives as is commonly found on the back of bumper stickers or the like, making installation and removable easier and less destructive to the surface on which it is mounted.

The present invention provides an inexpensive, easily installed, low maintenance, yet an effective and reliable system for removably displaying a variety of indicia on smooth surfaces, particularly vehicles.

2. Prior Art & General Background

While the prior art is replete with a variety of display devices for removably displaying indicia which might include bumper stickers and such, it nonetheless fails to teach a practical display system for use with vehicles in the like which is easily installed and reliably removable without leaving damage or residual paper, plastic or adhesive on the vehicle.

A list of prior patents which may be of interest is presented below:

| U.S. Pat. No. | Patentee(s) | Issue Date |
|---|---|---|
| 4,756,106 | Foster, P. | 07/12/1988 |
| 4,736,539 | Dickenson, N. | 04/12/1988 |
| 4,453,328 | Connolly, J. | 06/12/1984 |
| 4,305,216 | Skelton, S. | 12/15/1981 |
| 4,146,709 | Selleslags, F. | 01/27/1981 |
| 3,826,026 | Bevan, B. | 07/30/1974 |
| 3,553,865 | Jones, C. | 01/12/1971 |
| 2,925,675 | Lumpkin, F. | 02/23/1960 |
| 2,110,768 | Kellogg, G. | 03/08/1938 |
| 1,842,744 | Bronner, F. | 01/26/1932 |
| 1,836,154 | Cobbs, A. | 12/15/1931 |

While all of the above patents teach indicia display holders for certificates, signs, and even bumper stickers and such, none contemplate an effective system specifically designed for application on vehicles and the like in a manner which may be easily installed and removed without the need for tools or the significant risk of tearing the display or its holder and without damaging the application surface.

For example, U.S. Pat. No. 3,826,026 to Bevan, simply entitled "Display Device" teaches a sleeve for signs and such which is magnetically mounted to the vehicle. The manner of mounting contemplated by the '026 reference is not optimal, as the system is too easily removed from the system, and may fall off the vehicle when in motion or may be stolen when parked. Secondly, the system, with its magnetic mounting, may slide on the mounting surface, scratching it.

U.S. Pat. No. 4,453,328 entitled "Bumper Sticker Holder" to Connoly teaches a display device for autos and the like having a "mounting element adapted for attachment to a bumper by adhesive and mounting a holder element in adjustable pivotal position . . . ." This reference, while providing a means for interchangeably mounting various indicia, does not overcome the problem of removal of the system itself from the vehicle. For example, the system of '328 teaches a rather cumbersome and heavy pivotal frame system which is adhesively mounted.

The use of the adhesive provides a dual dilemma, i.e. too much adhesive for mounting the system will make it unremovable, or damage the paint or finish of the mounting surface during removal, while too little adhesive or a weaker adhesive will be insufficient to support the '328 system as configured.

U.S. Pat. No. 4,736,539 to Dickenson discloses a "Bumper Sticker Holder" comprising a base and a frame member, the base member being attached to the mounting surface via pop rivets (32), which permanently disfigure the mounting surface.

U.S. Pat. No. 4,756,106 to Foster teaches a "vehicle Message Holder", again teaching a "message holder for displaying interchangeable bumper sticker-type messages on a vehicle" utilizing a plurality of adhesive pads to adhere a frame-type case to the mounting surface. Utilization of the adhesive retaining means in the '106 reference as configured presents the same problems as addressed in the '328 patent, above.

3. General, Summary Discussion of the Invention

As may be discerned by a review of the above, the prior art, while teaching the general concept of a bumper sticker holder or the like, nonetheless fails to teach a design which is practical and does not cause damage to the surface to which it is applied.

The present invention overcomes these prior art problems by providing a system which reliably, economically and cost effectively allows the interchangeable display of a variety of bumper stickers or like indicia without damaging the mounting surface, while providing for easy installation and reliable removal when desired. Of course, in addition to the use of pre-printed bumper stickers and the like, the exchangeable sleeve design of the invention also allows the use of customized or hand printed signs and/or designs. As is well known, such items typically include indicia presented on a flat piece of material.

The preferred embodiments of the present invention, as configured, are comprised of a flexible material such as polyethylene, vinyl, or the like, and have a rectangular base member which is "hingedly" or foldingly affixed along one edge to a like configured, rectangular sleeve or frame member, having in effect an accordion-like fold between them. Further, the base member's front face and the frame member's rear face of the fold are adhered together by means of an adhesive for additional support but which faces can be relatively easily pulled apart in a removal operation.

The frame member includes a transparent face with, for example, a "zipper" on one side (e.g. the top) to allow for access to the interior of the sleeve for the emplacement of a possible variety of indicia, including, for example, bumper stickers, cards, hand-made signs, etc. The "zipper" is preferably in the form of, for example, a plastic or rubber sliding, slot fastener with a plastic or rubber head or the like, as used on plastic, zippered folders and such. This type of zipper is relatively water resistant, protecting the displayed item from the elements.

After the device has been adhered to, for example, a bumper, with the faces of the base and frame members adhered together, the device is removed preferably by grasping the edge of the frame member opposite or distal to the connecting "hinge" edge of the fold with the base member and slowly pulling it from the mounting surface, releasing the adhesive interface connection between the base and the frame member, temporarily leaving the base still adhered to the bumper. When the faces of the two members have been pulled apart, leaving only the edge connection between them, one merely further grasps the sleeve or frame member and continues to carefully pulls on it back in the opposite direction, using the frame member as a "handle", which then causes the base member by means of the edge "hinge" interconnection to be pulled from the mounting surface reliably and cleanly and without damage to the vehicle.

This always-available "handle" action is in contrast with the removal of, for example, a bumper sticker, in which the edge portion is often torn off in the removal process, making the removal of the remainder of the sticker that much more difficult. Thus, in the invention, the flexible frame member can be used effectively as a handle in the process of completely removing the display device.

An alternative utilization of the present invention provides for the addition of tabs affixed to the rear face of the base member by, for example, adhesion or integral formation. The tabs are configured to hold, for example, suction cups for mounting the display device onto, for example, the interior side of the automobile window so that the display can be viewed through he rear window.

Thus, the improved system in its preferred embodiment utilizes a flexible, zippered sleeve or envelope with a transparent front, with the display item (e.g. a bumper strip) being inserted into the sleeve through the zippered edge, which is thereafter zippered closed. The back of the system includes in effect an accordion-type fold, in which the fold sides are adhered together during use of the display device.

In the display device process, when its use is no longer desired, the forward fold carrying the sleeve structure is initially pulled away from the rear fold, with the forward fold then being effectively used as a gripping handle to reliably remove the rear fold part from the vehicle surface without any significant tearing of the flexible display item.

In an alternative embodiment (FIG. 4) suction cup tabs are provided to affix the display device to, for example, the rear window of the vehicle using the suction cups. To remove it, the suction of the suction cups is "broken."

The present invention thus provides an inexpensive, easily installed, low maintenance, yet effective system for removably displaying a variety of indicia on smooth surfaces, particularly on vehicles.

It is thus an object of the present invention to provide an indicia display system which is mountable on a variety of smooth surfaces and is configured to be easily and reliably removable without damaging the surfaces.

It is another object of the present invention to provide an indicia display system which is inexpensive to manufacture and easy to install.

It is still another object of the present invention to provide an indicia display system which may be configured to display a variety of devices, while protecting them from the elements.

Lastly, it is an object of the present invention to provide an indicia display system which may in the alternative be used in conjunction with supporting and displaying indicia on the interior side of a rear window or the like, for displaying the indicia through the window to the outside.

BRIEF DESCRIPTION OF THE DRAWING

For a further understanding of the nature and objects of the present invention, reference should be had to the following detailed description, taken in conjunction with the accompanying drawings, in which like parts are given like reference numerals, and wherein:

FIG. 1 is an isometric view of the preferred embodiment of the bumper sticker display system of the present invention, illustrating the device by itself, with the base pivotally separated from the sleeve member; while

FIG. 4 is a rear view of an alternative embodiment of the embodiment of FIG. 1, designed for the display of bumper stickers and other indicia from the inside wall of a vehicle window or the like; while

DETAILED DESCRIPTION OF THE PREFERRED, EXEMPLARY EMBODIMENTS

Figure 1:
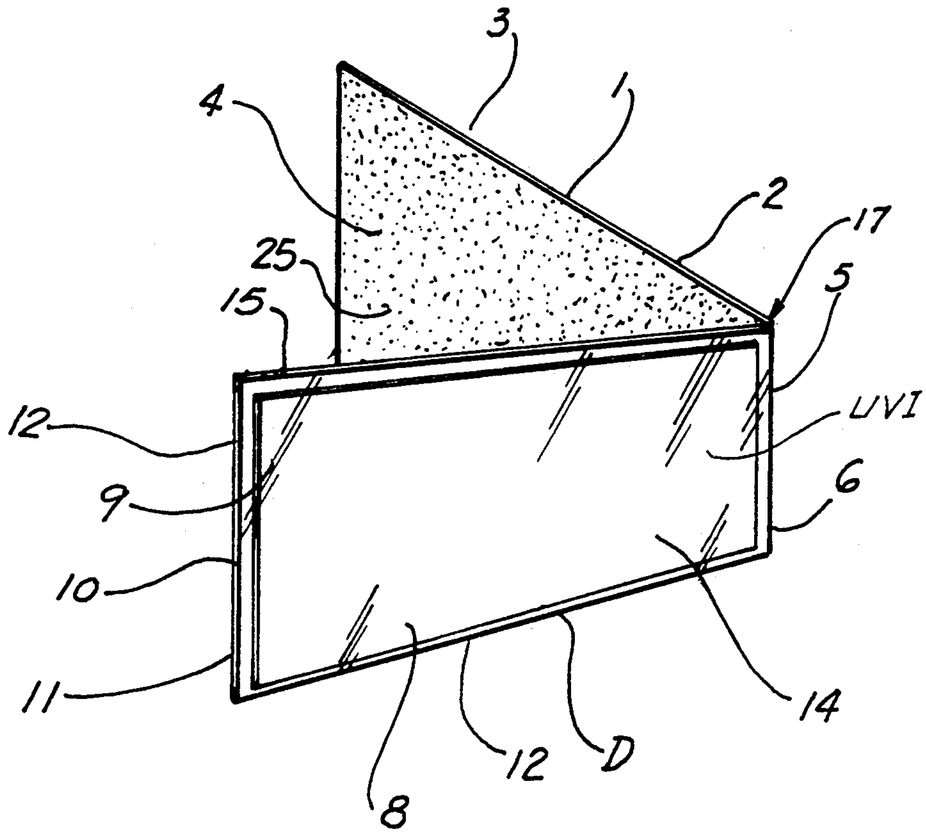

As can be seen in FIG. 1, the preferred embodiment of the present invention comprises a bumper sticker display device D fabricated of a strong, lightweight, flexible material wherein there is included a base member 1 having rear 2 and front 4 faces, each face having applied to it moderate (3) and light (25) adhesives, respectively. In order to prevent sticking, the rear wall 2 has applied to its adhesive (3) surface a wax paper cover, which is removed prior to installation, as further discussed infra.

Figure 1A:
FIG. 1A is a side, cross-sectional, detail view of the heat-sealed interconnection between the base and sleeve members of FIG. 1.

In similar dimension to and affixed along a common side edge 5 by means of heat fusing 6 or the like is a display sleeve member 8. The display sleeve member 8 includes two sheets of flexible material fused about their peripheral edges 12 (see detail of FIG. 1A), the rear sheet forming a rear wall 11, colored for example black, having front (9) and rear (10) faces, with the front sheet forming a transparent display wall 14.

The preferred, exemplary embodiments of the present invention contemplate the utilization of plastic sheeting, such as high density polyurethane. However, any relatively strong, flexible, fluid impervious material may be used which can at least in part be made transparent for display purposes. Further, ultraviolet or UV inhibitors (UVI) may be incorporated into the transparent display wall 14 for preventing deterioration or fading of the displayed item due to UV exposure from the sun's rays.

Incorporated parallel to preferably the upper edge 17 is a "zipper" 15 or flexible slot fastener, configured to be relatively impervious to weather for protecting the display contents. The "zipper" 15 of the preferred, exemplary embodiment of the present invention is heat sealed to the transparent, outer wall 14, but it may also be sealed such that one side of the zipper is affixed to the upper edge of the rear wall 11, with the other side of the zipper affixed to the upper edge of the display wall, selectively joining and disjoining the upper edge of the other wall 14 to the rear wall 11 via the opening and closing of the zipper.

As packaged, the display device D of the present invention is configured such that the front face 4 of the base member 1, with its relatively light adhesive 25, as discussed above, is joined in a face-to-face, accordion-type fold arrangement with the rear face 10 of the rear wall member 11 of the display sleeve 8.

In use, as the wax paper backing on the rear face 2 of the base member 1 is being removed, the adhesive (3) rear face 2 is applied to the vehicle bumper or any flat, smooth surface. In order to display a bumper sticker or like item, zipper 15 is slidingly opened, and the display item slipped face outward into the sleeve, and the zipper is then closed. The displayed bumper sticker is protected from the elements via the construction of the sleeve 8.

When the user is ready for changing the item to be displayed, he or she merely unzips the sleeve and then exchanges the bumper sticker or like item.

Figure 2:
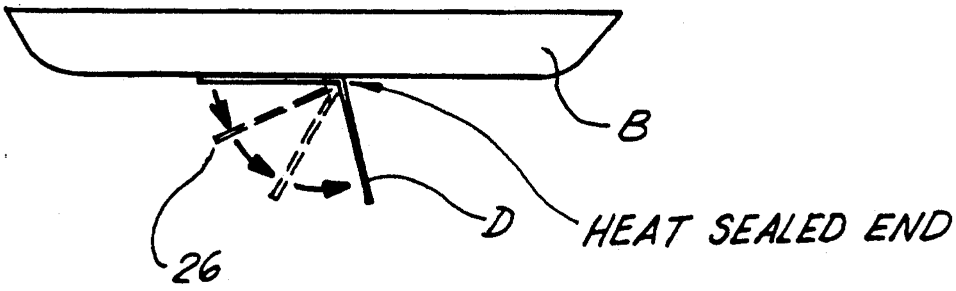
FIG. 2 is a top view of the bumper sticker display system of FIG. 1, attached to an exemplary vehicle bumper illustrating the first step of the removal of the device from the bumper.
Figure 3:
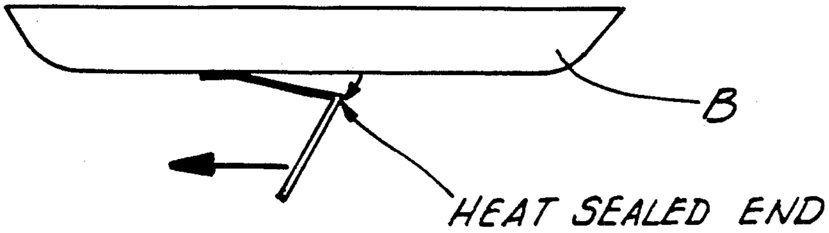
FIG. 3 is a top view of the bumper sticker display system of FIG. 1, similar in perspective to FIG. 2 but illustrating the second step of the removal of the device from the bumper.

FIGS. 2 and 3 illustrate the preferred method of removing the present invention from the mounting surf ace, which further and substantially differentiates it from the prior art. When the present invention is ready to be removed from the surface on which it is affixed, such as the vehicle bumper B shown in the drawings, the user merely partially peels the side edge 26 of the display sleeve 8 from its adhesion with the base member 1, grasps the peeled portion, and pulls it away from the mounting surface, parting the relatively light adhesion between the display sleeve 8 and the base member 1.

After the user pulls the display sleeve 8 so that it has completely separated its rear face 10 from the front face 4 of the base member 1, and the display sleeve 8 is only communicating with the base member 1 via the connecting or joining edge 5, the user then continues to pull the display sleeve member in a generally perpendicular fashion relative to the mounting surface but back in the opposite direction, thereby breaking and removing the base member's adhesion with the mounting surface, until it is completely removed. During this process, the envelope or sleeve portion of the device serves effectively as a pulling handle, adding to the ease and reliability of the removal process. The display device 1 of the present invention is thus removed from the vehicle, without marring the finish or leaving other permanent marks or damage.

Figure 4:
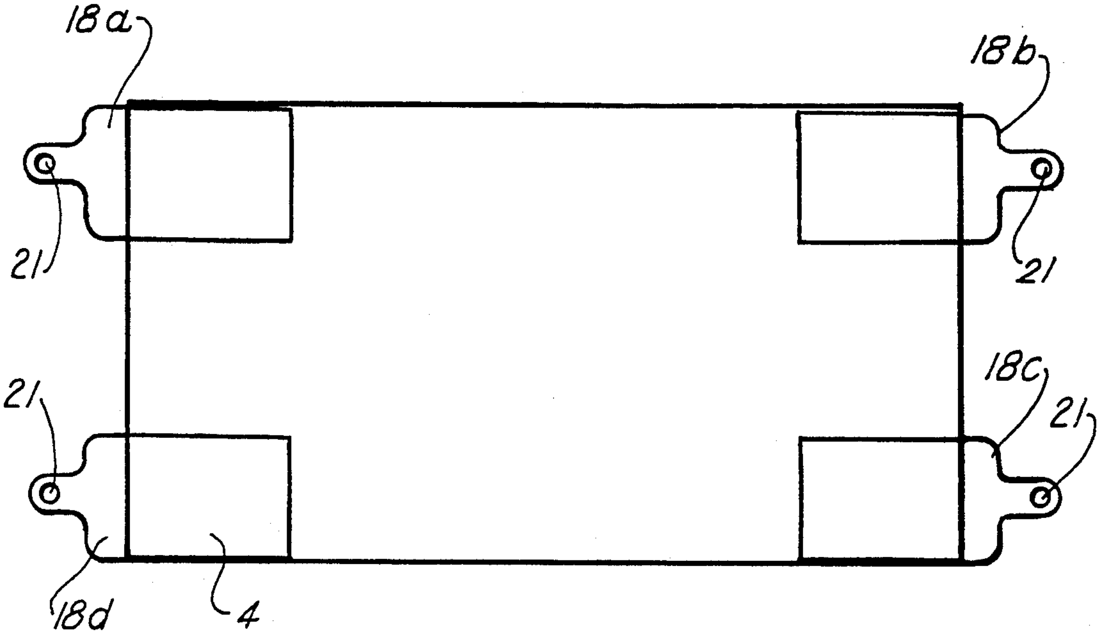
Figure 4A:
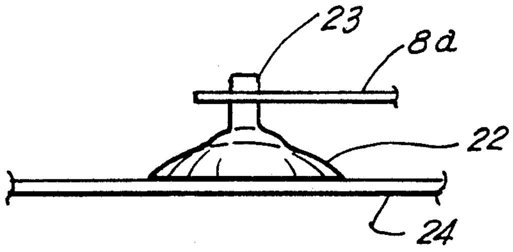
FIG. 4A is a side, cross-sectional, detail view of the alternative embodiment of FIG. 4 indicating the mounting of the alternative embodiment on a flat planar surface, in particular the suction cup mounting and its communication with the holding tabs.

FIGS. 4 & 4A illustrate an alternative feature of the present invention, and in fact can be incorporated in use with the above disclosed preferred, exemplary embodiment. This alternative feature or embodiment includes the incorporation of four adhesive tabs **18*a*–18*d*, which, when used in conjunction with mounting suction cups as illustrated in FIG. 4A**, allow the present system to be utilized and easily mounted on the inner or interior wall of a window for displaying indicia outside the window.

In use, referring particularly to FIG. 4A, the four tabs **18*a*–18*d* are adhesively affixed to the rear face 2 of base member 1**. In fact, the wax paper discussed supra needn't be removed, and the tabs may be affixed directly to the wax paper. As a further alternative to the present invention, in fact, the tabs may be built integrally into the wax paper or other backing.

Tabs **18*a*–18*d* include mounting apertures 21 configured to engagingly communicate with the bosses 23 of the suction cups 22, as illustrated in FIG. 4A, which are affixed to the smooth, glass mounting surface 24, configured one suction cup for each tab mounting aperture and spaced to communicate with the tabs 18*a*–18*d***.

The user merely mounts or attaches the tabs **18*a*–18*d* to the rear face 2 of the base member 1 (if not already affixed), affixes the bosses 23 to the mounting apertures 21, and mounts the suction cups 22** to the window in the desired display area. Alternatively, but less preferably, the suction cups could be affixed to the mounting surface and the tabs then engaged to the stems of the suction cups.

This alternative embodiment as disclosed and taught allows the user to interchangeably display various indicia from his/her vehicle window or the like, again allowing removal without damaging the mounting surface. Further, this invention may be re-used in the present manner, or, if using the display device of the preferred embodiment, may be with suction or adhesively mounted to the outer vehicle surface or bumper if desired.

Exemplary dimensions for the preferred, exemplary embodiment include a four inch (4") side edge and fifteen and one-half inch (15.5") upper and lower edge measurement, so as to effectively envelope the standard size bumper sticker.

The embodiments described herein in detail for exemplary purposes are of course subject to many different variations in structure, design, application and methodology. For example, the placement of the zipper can be changed to one of the other sides, including the bottom edge, if so desired. Additionally, the joining edges between the base member and the sleeve member could be at their other side edges or even at their bottom or top edges, although it is preferable that they be joined at their shorter side edges. Also, besides a rectangular configuration, other configurations are possible, and the base members, although preferably of the same size and configuration, could be of different sizes and/or configurations. The foregoing are, of course only exemplary of the many possible changes.

Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. A method of interchangeably displaying indicia presented on a flat piece of material on a mounting surface, comprising the following steps:

a. providing a display device, including a base member fabricated of flexible material, said base member having front and rear races and peripheral edges, said rear face of said base member having first adhesive means applied thereto for adhesively communicating with the mounting surface;

a display sleeve having peripheral edges, said display sleeve being of flexible material and including a rear wall having front and rear faces and a front wall formed of a transparent material, said rear and front walls being joined to form a sleeve having an interior for holding indicia to be displayed;

selective closing means affixed to said display sleeve for selectively sealing and unsealing said interior of said display sleeve;

second adhesion means removably adhering said front face of said base member to said rear face of said rear wall of said display sleeve; and flexible joining means for flexibly joining said base member to said display sleeve;

b. applying said adhesive rear face of said base member to the mounting surface;

c. opening said selective closing means affixed to said display sleeve;

d. placing said indicia to be displayed therein; and e. closing said selective closing means; wherein the display device is removable by grasping an edge of said display sleeve distal to said flexible joining means and peeling it away in a generally perpendicular fashion relative to said mounting surface moving toward said flexible joining means separating said display sleeve from said base member, overcoming said second adhesion means, and thereafter continuing to grasp and pull said display sleeve in generally perpendicular fashion relative to said mounting surface but moving back in the opposite direction until said rear face of said base member is separated from said mounting surface, overcoming said first adhesive means.

2. The method of claim 1, wherein said selective closure means is a slotted fastener.

3. The method of claim 1, wherein said selective closure means is a zipper.

4. The method of claim 1, wherein steps "c" and "d" are performed before step "b".

5. The method of claim 1, wherein the indicia is interchanged by repeating steps "c" and "d".

6. The method of claim 1, wherein step "d" includes the step of using a bumper sticker for said indicia.

* * * * *